US006473631B1

(12) United States Patent
Siddoway et al.

(10) Patent No.: US 6,473,631 B1
(45) Date of Patent: Oct. 29, 2002

(54) VIDEO SWIVEL PHONE

(75) Inventors: Craig F Siddoway, Davie, FL (US); Scott H. Richards, Plantation, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/466,645

(22) Filed: Dec. 20, 1999

(51) Int. Cl.$^7$ .............................. H04B 1/08; H04B 1/38
(52) U.S. Cl. ...................... 455/575; 455/348; 455/556; 379/433.02; 348/14.02
(58) Field of Search ................................ 455/556–557, 455/575, 90, 348, 349, 566; 379/433.02; 348/14.01–14.07

(56) References Cited

U.S. PATENT DOCUMENTS

| | | | | |
|---|---|---|---|---|
| 5,111,498 A | * | 5/1992 | Guichard et al. | 348/14.01 |
| 5,491,507 A | * | 2/1996 | Umezawa et al. | 348/14.02 |
| 5,711,013 A | * | 1/1998 | Collett et al. | 455/349 |
| 6,314,302 B1 | * | 11/2001 | Haferbeck et al. | 348/14.01 |
| 6,323,892 B1 | * | 11/2001 | Mihara | 348/14.01 |
| 6,335,753 B1 | * | 1/2002 | McDonald | 348/14.01 |

* cited by examiner

Primary Examiner—Lee Nguyen
Assistant Examiner—Simon Nguyen
(74) Attorney, Agent, or Firm—Scott M. Garrett

(57) ABSTRACT

A wireless video swivel phone device includes a pivoting module. The pivoting module includes at least one video camera lens for capturing video images from at least one direction. The pivoting module rotates to allow the at least one video camera lens to capture video images from different directions. The pivoting module includes an ear cup portion that provides audio output to a user's ear for using the wireless video swivel phone as an ear-to-mouth audio phone communication device.

5 Claims, 4 Drawing Sheets

VIDEO SWIVEL PHONE

TECHNICAL FIELD

This invention relates in general to wireless communication devices that can capture and transmit video images and that can receive and display video images, and more particularly to a portable videophone.

BACKGROUND OF THE INVENTION

With the recent advent of powerful video compression algorithms and miniaturized video camera technology such as the use of charge coupled devices (CCD) in consumer products, video telephones are becoming a commercially viable alternative means of communication. Additionally, wireless communication devices such as cellular telephones, cordless telephones, two-way wireless communicators, and other such two-way portable wireless communication devices, are including powerful and fast processors capable of managing video signals and compression for communication over a wireless communication channel. Therefore, with the combination of the aforementioned technologies it is becoming commercially practicable to offer wireless communication devices capable of capturing and transmitting video images and receiving and displaying video images to provide a wireless video phone consumer product.

Typically, a telephone unit comprises a handset that includes an ear portion and a mouth portion for a user to listen and to speak over the telephone. Likewise, a wireless communication device such as a cellular telephone or cordless telephone includes an ear portion and a mouth portion for listening and for speaking. The ear portion in these devices is normally constructed suitable for resting in close proximity to a users ear. The mouth portion normally includes a microphone transducer with an audio response profile directed generally in the vicinity of the user's mouth.

A video camera lens is typically located in a fixed location allowing the user to move into or out of a fixed video scene. The captured video image of the video scene is delivered from the video camera device in the telephone unit across a wired network, such as the public switched telephone network (PSTN) to another receiving device that can display the image on a screen of a video display. Although capturing a fixed video scene has its merits, such as allowing the user to move into and out of the fixed scene, this arrangement lacks flexibility for the user in certain applications. For example, the user may wish to capture a moving scene rather than a fixed scene. In such a case, the user would typically have to pan the entire telephone communication device across a field of view to create a moving scene. This panning activity, unfortunately, will typically also move the audio input and output portions of the unit. The user may be precluded from speaking and/or listening via the telephone unit due to the panning activity. Additionally, if the telephone unit includes a video display screen then the user may also be precluded from viewing the video display screen during the panning action.

Accordingly, there is a need to overcome the certain deficiencies with the known prior art as discussed above and particularly to enhance the flexibility of use of a video telephone.

DESCRIPTION OF THE PREFERRED EMBODIMENTS

Figure 1:
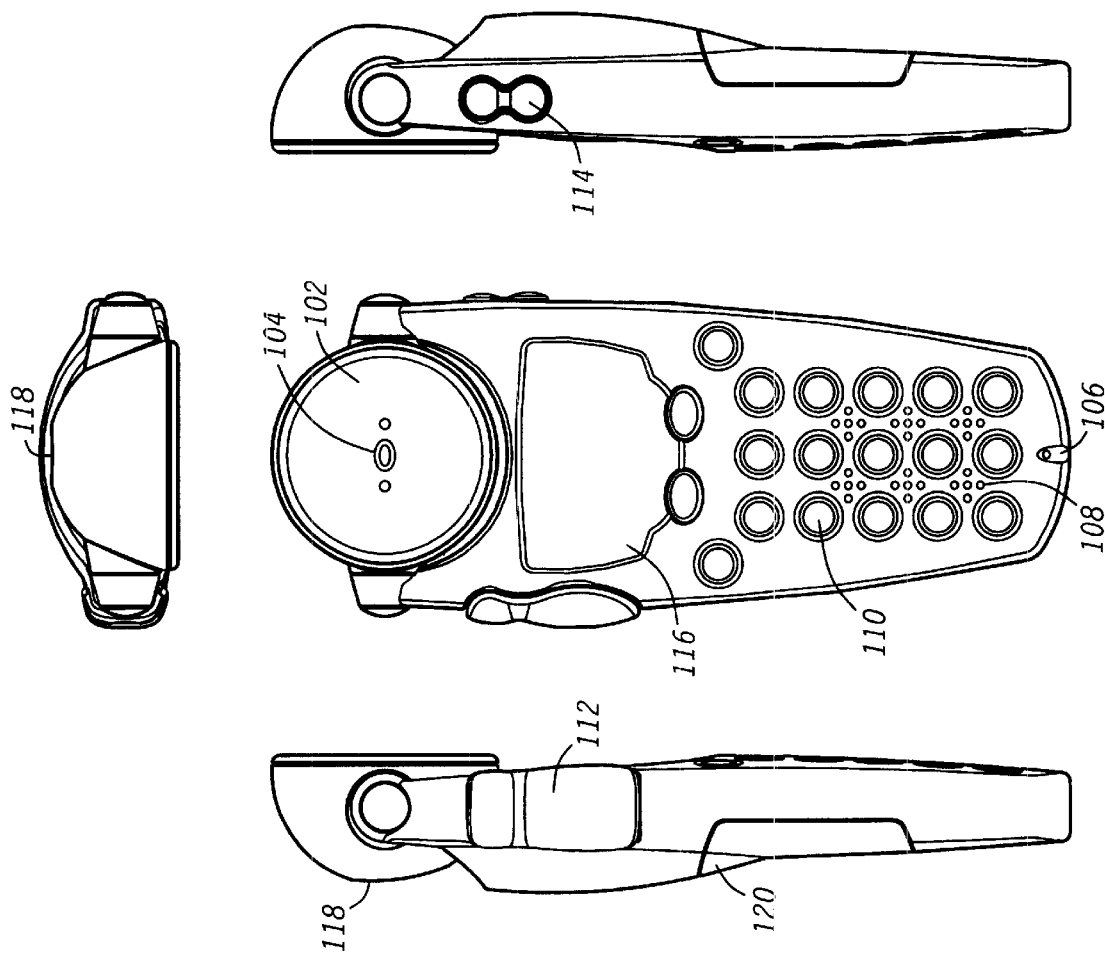
FIG. 1 comprises front, right, left, and top, planar views of an exemplary video swivel phone according to a preferred embodiment of the present invention.
Figure 2:
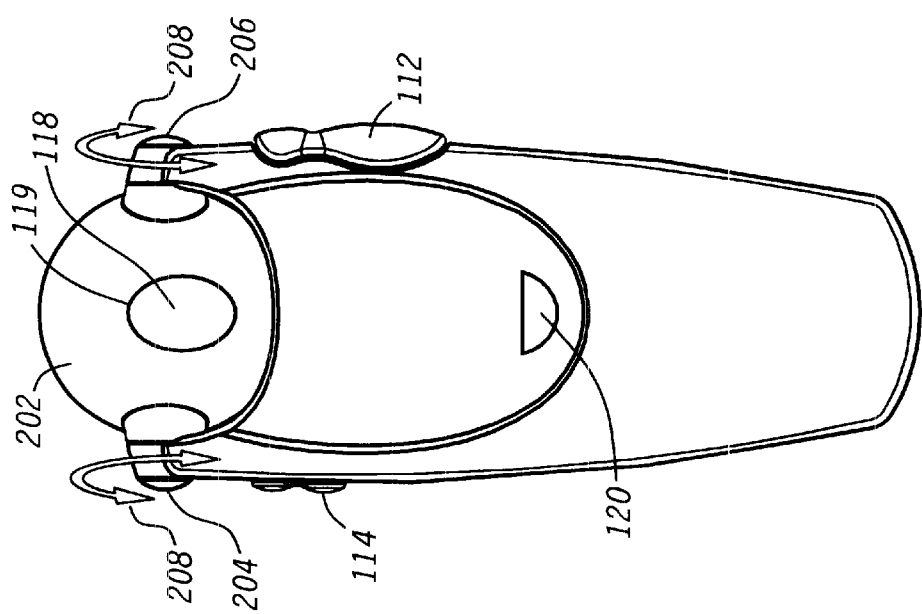
FIG. 2 is a rear planar view of the video swivel phone of FIG. 1 in accordance with a preferred embodiment of the present invention.

Referring to FIGS. 1 and 2, an exemplary video swivel phone 100 includes an ear portion, or ear cup 102, and provides an ear audio output transducer 104 located in the ear portion to deliver an audio signal to a user's ear during communication. The phone 100 also includes a mouth portion, or microphone audio input 106, that receives audio input generally directed from the user's mouth. The ear audio output transducer 104 and the microphone audio input 106 are arranged on the video swivel phone 100 for using the video swivel phone as an ear-to-mouth audio phone communication device.

A speakerphone audio output 108 provides the user with an alternative means of audio communication via the phone 100. The speaker phone audio output 108 in combination with the microphone audio input 106 allows the user to use the phone 100 similar to a speaker phone. The user can speak into the microphone audio input 106 and can listen via the speakerphone audio output 108.

A set of keys, or keypad 110, provide a means for user input into the phone 100. These keys 110 can be used to enter control and/or data user input into the phone 100. Other forms of user input means are also anticipated as would be obvious to those of ordinary skill in the art. For example, a push-to-talk switch 112 is included in the exemplary phone 100 to allow the user control over when to activate the microphone audio input 106 to capture audio input into the phone 100. When the push-to-talk switch 112 is released normally the phone 100 is in an audio output mode delivering audio output to the ear audio output transducer 104 and/or the speaker phone audio output 108 as may be required by a mode of communication with the user. Additional user input means, such as buttons 114, may be used to control certain functions of the phone 100. For example, the buttons 114 can control the level of audio a output. One button can be pushed by the user to raise the level of audio output and the other button can be pushed by the user to lower the level of audio output, such as to adjust the level of audio output in response to varying ambient noise audio conditions.

In the preferred embodiment of the present invention, a video display screen 116 is included in the phone 100 to provide the user with moving video images that are received from a remote video capturing device such as another video phone being used by another person to communicate with the user of the video phone 100. The video display screen 116 can be constructed for monochrome video image display and alternatively for color video image display as may be desired by particular applications. With the advent of powerful compression algorithms and embedded microprocessors in portable devices such as the videophone 100 it is commercially feasible to wirelessly communicate the larger amount of information utilized in delivering color video images to the user.

A miniaturized charge couple device (CCD) based video camera 118, in the preferred embodiment, is located in a substantially opposing arrangement to the ear cup 102. The video camera 118 includes a lens 119 that is aiming generally in an opposing direction to the ear cup 102. Preferably, the lens 119 is recessed into the housing for the ear portion of the phone 100 to protect the lens from direct contact with external surfaces when the phone 100 is, for example, located on top of another object such as a table top. By locating the video camera 118 in a substantially opposing arrangement to the ear cup 102 the user is able to view the video display screen 116, for example, while the video camera is aimed outwardly toward a subject who's moving image is being captured by the video camera. Further, the user can view on the video display screen 116 the moving image being captured by the video camera 118.

The ear portion of the phone 100 comprises a floating module arrangement as will be discussed below. The ear cup 102 and the video camera 118 are contained in a housing module that is cradled between, in this example, support bearings 204, 206, which extend from the main housing of the phone 100. These bearings 204, 206, are formed as the front and rear halves of a main phone housing are attached to each other.

Preferably the main housing comprises a handheld portion of the phone 100. The user can manually hold the phone 100 while orienting the ear cup 102 and the video camera 118 as discussed below. The pivoting or floating module 202 is suspended between the bearings 204, 206, by an integrated perpendicular shaft extending through a centerline of the pivoting module 202. In this example, the pivoting module 202 can rotate 208 about an axis generally formed by these bearings 204, 206. However, rotation about another axis is anticipated by the present invention as may be obvious to one of ordinary skill in the art.

In one preferred embodiment of the present invention, electrical connection from the main phone housing to the pivoting module 202 is routed via the bearings 204, 206. To prevent overstressing of the electrical wires a shaf-mounted pair of stops permit rotation or pivoting about a limited angular distance, such as 180 degrees. In this way, the video camera 118 can be aimed outwardly toward a subject or a scene for capturing video images while viewing the images on the video display screen 116.

The floating module 202 can also be pivoted to aim the video camera 118 directly at the user of the phone 100 to utilize the phone 100 in a video conferencing application. The image of the user is captured by the video camera 118 and transmitted to the phone unit of another user while the video image of the other user is transmitted from the other unit and received and displayed on the video display screen 116 during the video conference application. The speaker phone audio output 108 and the microphone audio input 106 provide audio I/O for the video conferencing application.

In an alternative preferred embodiment of the present invention, the pivoting module can be arranged to continuously rotate about the axis of the bearings 204, 206, as discussed below. Instead of using the 2 stops to limit the rotation of the pivoting module 202 as discussed above, the continuously rotatable module configuration does not include the stops.

The electrical interconnection between the continuously rotatable module 202 and the main housing of the phone 100, in this alternative embodiment, utilizes electrical contacts that maintain electrical connection while the pivoting module 202 continuously rotates about the axis of the bearings 204, 206. This is accomplished, for example, by utilizing spring loaded contacts which rest against a rotary contact shaft parallel to the axis of rotation. This is similar to commonly available "tangle eliminators" used for corded telephone handsets and similar devices. It allows unlimited rotation with continuous electrical contact.

Figure 3:
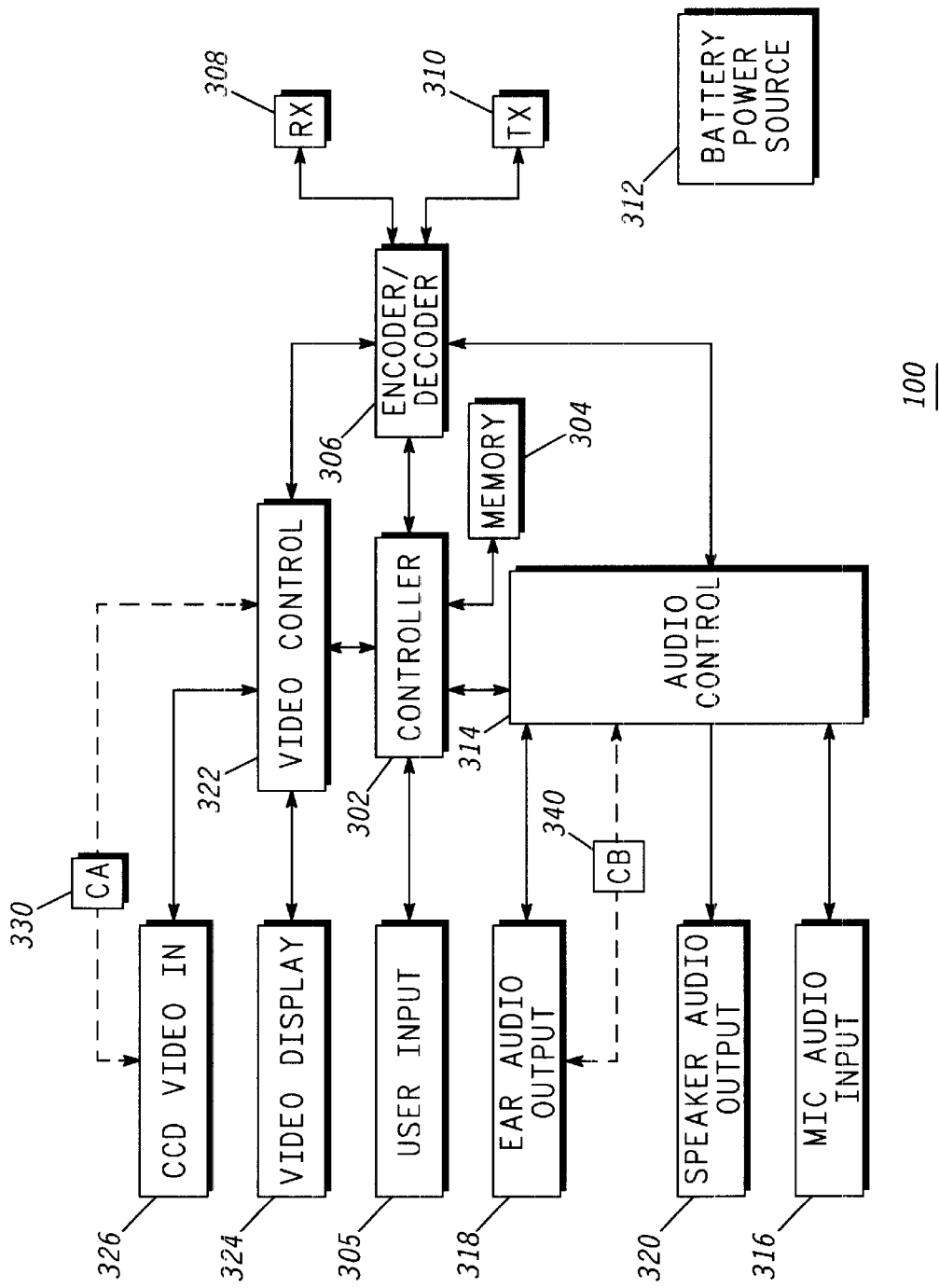
FIG. 3 is an electrical block diagram illustrating an exemplary electrical circuit model for the video swivel phone of FIG. 1 according to a preferred embodiment of the present invention.

A latched door 120 can be removed to expose a battery compartment. The battery for the phone 100 is preferably rechargeable and replaceable. As illustrated in FIG. 3, the a battery power source 312 supplies power to all the electrical circuits in the video swivel phone 100. The battery 312 preferably comprises lithium ion technology. However, other suitable rechargeable battery technology may be substituted to supply the necessary power for the electrical circuits.

The controller 302 operates with the memory 304 to provide functions and features of the phone 100 as will be discussed below. In this example, the phone 100 comprises a wireless cellular phone technology. Such wireless cellular phone technology is commercially available in the iDEN 1000 cellular phone product manufactured by Motorola Inc. of Schaumburg Illinois, U.S.A. The controller 302 is powerful enough to handle video compression algorithms that are commercially available today.

The user input 305 is electrically coupled to the controller 302 to monitor and receive input from the user of the videophone 100. The user input 305, for example, comprises the keypad 110, and the push-to-talk button 112 and the audio level control buttons 114. See FIG. 1. However, other suitable user input means are anticipated by the present invention as are well known to those of ordinary skill in the art.

An encoder/decoder module 306 is electrically coupled to the controller 302 and to a receiver module 308 and to a transmitter module 310. A transmitted message is received by the receiver module 308 and then decoded by the decoder module 306. Video image information contained in the received messages can be displayed on the video display screen. On the other hand, messages can be encoded by the encoder 306 and then transmitted by the transmitter module 310. The transmitted messages contain image information corresponding to captured images such as captured by the video camera 118. In this way, messages, typically transmitted in packets of information, are wirelessly received and/or transmitted by the videophone 100. This wireless message communication mechanism is well known to those of ordinary skill in the art.

The controller 302 and the encoder/decoder module 306 are electrically coupled to an audio control and conditioning module 314. The audio control and conditioning module 314 can be controlled by the controller 302 for multiplexing, amplifying, and conditioning audio signals between the audio I/O of the video phone 100 and the encoder/decoder module 306. A microphone audio input transducer 316 is electrically coupled to the audio control and conditioning module 314. The microphone audio input module 316 is shown as the microphone audio input 106 in FIG. 1. An ear audio output transducer 318 is electrically coupled to the audio control and conditioning module 314. The ear audio output transducer 318 generates audio output signals that can be provided to the user of the phone 100 such as via the ear audio output 104 in the ear cup 102. See FIG. 1.

The speaker audio output transducer 320 is also electrically coupled to the audio control and conditioning module 314. The speaker audio output transducer 320 is shown in FIG. 1 as part of the speakerphone audio output 108.

A video control module 322 is electrically coupled to the controller 302. The video control module 322 is also electrically coupled to the encoder/decoder module 306. Video signals that are part of messages being encoded/decoded by the encoder/decoder module 306 are processed by the video control module 322. Received and decoded video images are passed from the decoder 306 to the video control module 322 and then presented to the user via the video display module 324. The user can view the video images on the video display screen 116. A charge coupled device based video camera input module 326 is electrically coupled to the video control module 322. The video camera input module 326 captures video images such as via the video camera 118 as illustrated in FIG. 1. Additionally, the video control module 322 can receive the video image information from the video camera input module 326 and route this information to the encoder 306 to create a message containing the video image information to be transmitted via the transmitter module 310. Optionally, the video camera input module 326 provides the video input information to the video control module 322 which then forwards the video information to the video display module 324 to display the image on the video display screen 116.

Typically, the video camera input module 326 and the ear audio output module 318 are located in the pivoting module 202 and are electrically coupled to the other electrical circuit elements of the video phone 100 through wire cabling that is routed via the bearings 204, 206, as discussed above. Alternatively, a set of continuously rotatable electrical contacts 330, 340, can be utilized to provide continuous electrical connection while the pivoting module 202 is continuously rotated about the axis of the bearings 204, 206. The construction use of such continuously rotatable electrical contacts 330, 340, has also been discussed above.

In this way, as discussed above, the video swivel phone 100 allows the user the flexibility to aim the lens 119 of the video camera module 118 in a number of directions while conveniently holding the phone 100 in the user's hand. The video camera 118 can be aimed outwardly away from the user and capture video image of a subject while the user of the phone 100 can view the captured image on the video display screen 116. Alternatively, the pivoting module 202 can be rotated such that the lens 119 of the video camera 118 is aimed directly at the user while the user conducts a teleconference using the phone 100. In this mode, the phone 100 operates like a speaker phone with audio input 106 and audio output 108 providing the speaker phone I/O functions.

Figure 4:
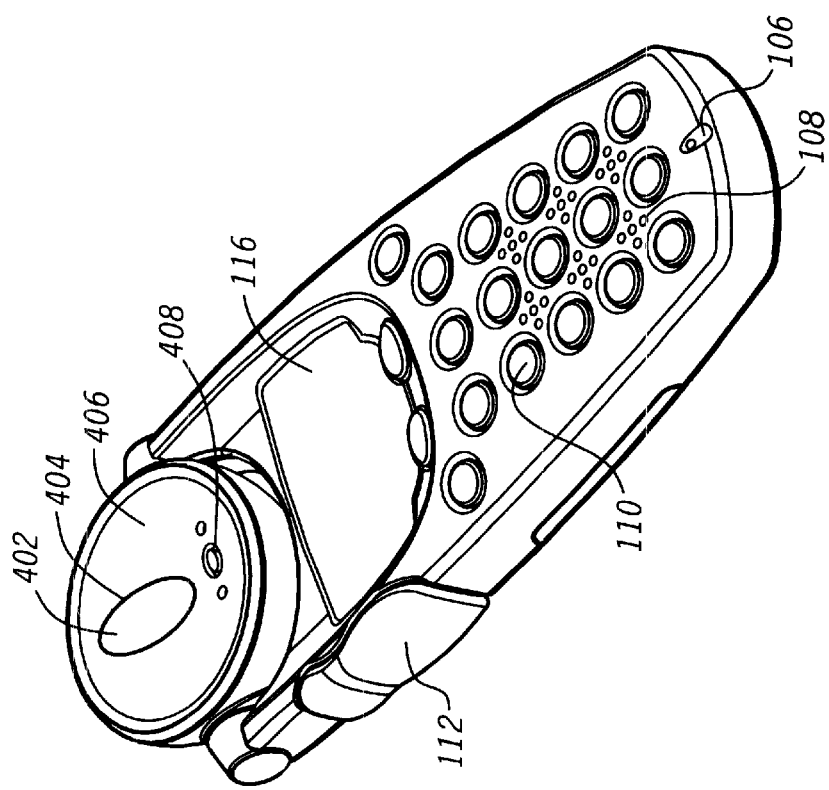
FIG. 4 is a front perspective view of an exemplary video swivel phone according to an alternative preferred embodiment of the present invention.

In yet another alternative embodiment to the present invention, as illustrated in FIG. 4, a video camera 402 comprises a lens 404 located in a recess in the ear cup 406. Ear audio output 408 is also located in the ear cup 406. The ear audio output 408 is oriented about the rotatable portion 202 in substantially the same direction as the lens 404. In this way, the user of the phone 100 can utilize the phone as a speaker phone for holding a video conference while conveniently switching the mode of operation of the phone 100 to a normal audio talk/listen mode and disabling the video camera 402 from operation during this mode. The ear cup 406 conveniently allows the user's ear to listen to the audio output from the audio output module 408 and the microphone audio input 106 allows the user to speak into the phone 100. Optionally, the video camera 402 is included in combination with the video camera 118 in one videophone unit 100. Each video camera 404, 118, is electrically coupled to the video camera input module 326 and to the video control module 322. This flexible arrangement allows the user to select, such as via the user input 110, the source of the video input to the phone 100. Either video camera 118, 402, or both can be selected as a source of video image input into the video phone 100. In this way, for example, the user can engage in a video conference using the phone 100 while selectively capturing video input from the outwardly aiming video camera 118 to capture video images from a surrounding scene or a subject other than the user. This is an extremely flexible arrangement that is a significant improvement over any known video capture and transmission communication device.

Although specific embodiments of the invention have been disclosed, it will be understood by those having ordinary skill in the art that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A video swivel phone comprising:
    a pivoting module rotatably coupled to a handheld portion of the video swivel phone,
    the pivoting module including:
        an ear cup including an ear audio output for providing audio output to a user's ear; and
        a video camera input for capturing video images, the video camera input oriented in an opposing direction to the ear cup; and
    the handheld portion of the video swivel phone including:
        a video display screen for displaying video images to a user; and
        a microphone audio input for receiving audio from a user, and wherein the pivoting module is rotatable about an axis to orient the video camera input and the ear cup in a plurality of directions.

2. The video swivel phone of claim 1, wherein the pivoting module is continuously rotatable about the axis.

3. The video swivel phone of claim 1, wherein the video display screen is electrically coupled to video camera input for displaying on the video display screen a representation of the captured video images.

4. The video swivel phone of claim 1, further comprising a wireless transmitter module electrically coupled to the video camera input for wirelessly transmitting messages containing video image information corresponding to the captured images.

5. The video swivel phone of claim 3, further comprising a wireless receiver module electrically coupled to the display screen for wirelessly receiving messages containing video image information and displaying on the video display screen video images corresponding to the video image information.

* * * * *